United States Patent [19]
Clouston

[11] Patent Number: 5,983,966
[45] Date of Patent: Nov. 16, 1999

[54] SELF-PROPELLED TREE PRUNING APPARATUS

[76] Inventor: John L. Clouston, 92966 Hwy. 99 S., Junction City, Oreg. 97448

[21] Appl. No.: 09/190,955

[22] Filed: Nov. 12, 1998

[51] Int. Cl.[6] ........................................................ B27L 1/00
[52] U.S. Cl. ..................................... 144/24.13; 47/1.01 R; 144/208.2; 144/343; 182/133
[58] Field of Search ............................ 30/379; 47/1.01 R, 47/8; 144/24.13, 208.2, 343; 182/133, 188

[56] References Cited

U.S. PATENT DOCUMENTS

| | | | |
|---|---|---|---|
| 2,477,922 | 8/1949 | Emery et al. | 144/24.13 |
| 2,482,392 | 9/1949 | Whitaker | 144/24.13 |
| 2,583,971 | 1/1952 | Shuff | 144/24.13 |
| 2,612,724 | 10/1952 | Llewellyn | 144/24.13 |
| 2,727,335 | 12/1955 | Susil | 144/24.13 |
| 3,117,401 | 1/1964 | Talley . | |
| 3,315,714 | 4/1967 | Meier | 144/24.13 |
| 3,326,251 | 6/1967 | Herolf et al. . | |
| 3,364,962 | 1/1968 | Ottenbach et al. | 144/24.13 |
| 3,457,973 | 7/1969 | Meier . | |
| 3,500,883 | 3/1970 | Herolf et al. . | |
| 3,545,509 | 12/1970 | Baxter, Jr. | 144/24.13 |
| 4,527,603 | 7/1985 | Hori | 144/24.13 |
| 4,690,184 | 9/1987 | Fuminao | 144/24.13 |
| 5,127,453 | 7/1992 | Wingate-Hill et al. . | |
| 5,524,685 | 6/1996 | Barnhill et al. . | |

FOREIGN PATENT DOCUMENTS

| | | |
|---|---|---|
| 538161 | 4/1993 | European Pat. Off. . |
| 1270331 | 6/1968 | Germany . |
| 2316756 | 10/1974 | Germany . |

OTHER PUBLICATIONS

Reutebuch et al; Early Pruning of Douglas–Fir: Production Rates and Product Implications; American Society of Agricultural Engineers; Paper Presented at Meeting held Dec. 14–17, 1993.

Marshal; Plantation Forestry in New Zealand; Publication and date unknown; pp. 3 & 4.

Author Unknown; Current Farming Techniques as They Apply to Pruning; Paper –14 pp.; No Other Information.

*Primary Examiner*—W. Donald Bray
*Attorney, Agent, or Firm*—Robert E. Howard

[57] ABSTRACT

A self-propelled tree pruning apparatus having a cutting tool with helical edges, such as a milling head. The pruning apparatus is comprised of a frame, at least one pair of driven wheels rotatably attached to the frame, a pair of hugger wheels rotatably held by support means, the support means being adjustably attached to the frame to permit the hugger wheels to be positioned a distance from the driven wheels sufficient to allow the trunk of a tree to be pruned to fit between the driven wheel and the hugger wheels, pneumatic means, such as air bags, for urging the hugger wheels toward the driven wheels, the cutting tool being attached to a drive shaft that is attached to the frame in a manner to allow the cutting tool to move along three axes, and a self-powered motor for driving the driven wheels and cutting tool. In operation, the pruning apparatus is mounted on the trunk of a tree to be pruned, with driven wheels on one side thereof and a pair of hugger wheels located on the other side of the trunk. The driven wheels cause the pruning apparatus to climb the trunk of the tree to be pruned to a desired height. The pruning apparatus follows a helical path around the trunk and upwardly, cutting limbs of all sizes as its rotating cutting tool comes into contact with them. Upon achieving the desired height up a tree trunk, the engine is throttled back to idling speed and the pressure in the air bags released, thereby permitting the apparatus to descend to the ground.

19 Claims, 7 Drawing Sheets

SELF-PROPELLED TREE PRUNING APPARATUS

BACKGROUND OF THE INVENTION

This invention relates to a self-propelled tree pruning apparatus.

Trees are pruned for many reasons. However, commercial pruning of forest trees, such as Douglas fir and ponderosa pine, is undertaken primarily to produce trees having knot-free clearwood in the pruned area of the tree. When the lower branches of young forest trees are properly removed, occlusion or covering over of the removed branch stub takes place as the tree grows, thereby providing knot-free clearwood in the pruned area when the mature tree is harvested. Effective pruning requires that all branches, regardless of size, be removed up to a height of about thirty feet from the ground. Factors affecting rapid occlusion include trim angle, closeness of cut, and cut quality (i.e., smoothness of cut).

Currently the standard pruning method involves manual pruning using saws and hand shears. Manual labor is unsatisfactory for a number of reasons, such as safety, cost, and use of incorrect pruning techniques by untrained workers.

A number of pruning machines have been suggested. Some, such as the "Tree Witch", are hydraulically powered; some, such as the "Tree Monkey", are gasoline powered. Some use shearing devices for pruning; some, such as the Tree Monkey, use chain saws. All of these devices are difficult to operate and maintain, and do not provide the same quality of cut as manual pruning.

It is an object of the present invention to provide a self-propelled tree pruning apparatus which is easy to use and maintain, prunes rapidly, and provides a cut equal or superior to that of mechanical pruning.

SUMMARY OF THE INVENTION

The self-propelled pruning apparatus of the present invention has a frame to which at least one pair of driven wheels are rotatably attached and adapted to contact one side of the trunk of a tree to be pruned, a pair of hugger wheels rotatably attached to said frame in a manner such that they are located on the other side of said tree to be pruned, and a rotatable cutting tool that can move along three axes.

Preferably, two pairs of driven wheels are used, with one pair being located at the upper end of the frame and the other pair at the lower end of the frame. The axes running through the axles of the upper pair of driven wheels are spaced apart from the axes running through the axles of the lower pair of driven wheels a distance such that when the pruning apparatus is placed on a tree to be pruned, all of the driven wheels are positioned at an angle to the horizontal.

The hugger wheels are rotatably held by support means. The support means is adjustably attached to the frame to thereby permit the hugger wheels to be positioned a distance from the driven wheel sufficient to allow the trunk of the tree to be pruned to fit in the space between the driven wheels and the hugger wheels and for the hugger wheels to contact the side of the tree trunk opposite that contacted by the driven wheels.

Pneumatic compression means are provided to urge the hugger wheels toward the driven wheels to thereby compressively hug or hold the pruning apparatus on the tree trunk. The pneumatic means for urging the hugger wheels toward the driven wheels are preferably at least one inflatable air bag, and, most preferably, a pair of inflatable air bags.

A rotatable cutting tool with helical cutting edges is held in a vertical position which, when the pruning apparatus is located on a tree trunk, is at a slight angle to the longitudinal axis of the trunk of the tree to be pruned. The rotatable cutting tool is supported by, and attached to, one end of a drive shaft. The drive shaft is attached to the frame in a manner adapted to allow movement of the drive shaft and attached cutting tool along three axes. Upon contact with a tree limb, the cutting tool moves upwardly in a generally vertical direction along a first axis, and inwardly toward the juncture of the limb and tree trunk along a second axis. The cutting tool may also move back and forth along a third axis perpendicular to the longitudinal axis of the tree limb.

A self-powered motive means, such as a battery powered or gasoline powered engine, is attached to the frame. The drive shaft of the motor is separately connected to the driven wheels and cutting tool by suitable power trains.

Radio controlled servo mechanisms are used to operate the engine and to control the pressure in the air bags, the radio control transmitter being of the type that is capable of generating separate signals to two servo mechanisms.

In operation, the pruning apparatus is mounted on the trunk of a tree to be pruned, with the driven wheels located on one side of the trunk and the pair of hugger wheels located on the opposite side of the trunk. The engine is started, and initially kept at idling speed. The air bags are inflated, which compresses or pushes the hugger wheels toward the driven wheels and clamps the pruning apparatus to the tree trunk. The throttle of the engine is then advanced to operate the motor at full speed, and thereby drive the driven wheels and rotate the cutting tool.

Since the axles of one pair of driven wheels are offset from the axles of the other pair of driven wheels, the driven wheels are positioned at an angle to the tree trunk and the pruning apparatus ascends the tree trunk along a helical path. As the pruning apparatus ascends the tree trunk, the cutting tool comes into contact with all of the tree's branches along its path of ascent and severs them.

When the pruning apparatus achieves the height desired, usually about thirty feet from the ground, the throttle of the engine is reduced to idling speed and the compressed air inflating the air bags exhausted to the atmosphere. The pruning apparatus then quickly descends the tree trunk, back to ground level. In the event the descent is too rapid, the air bags can again be inflated to brake the downward speed of the apparatus.

DESCRIPTION OF THE PREFERRED EMBODIMENTS

Figure 1:
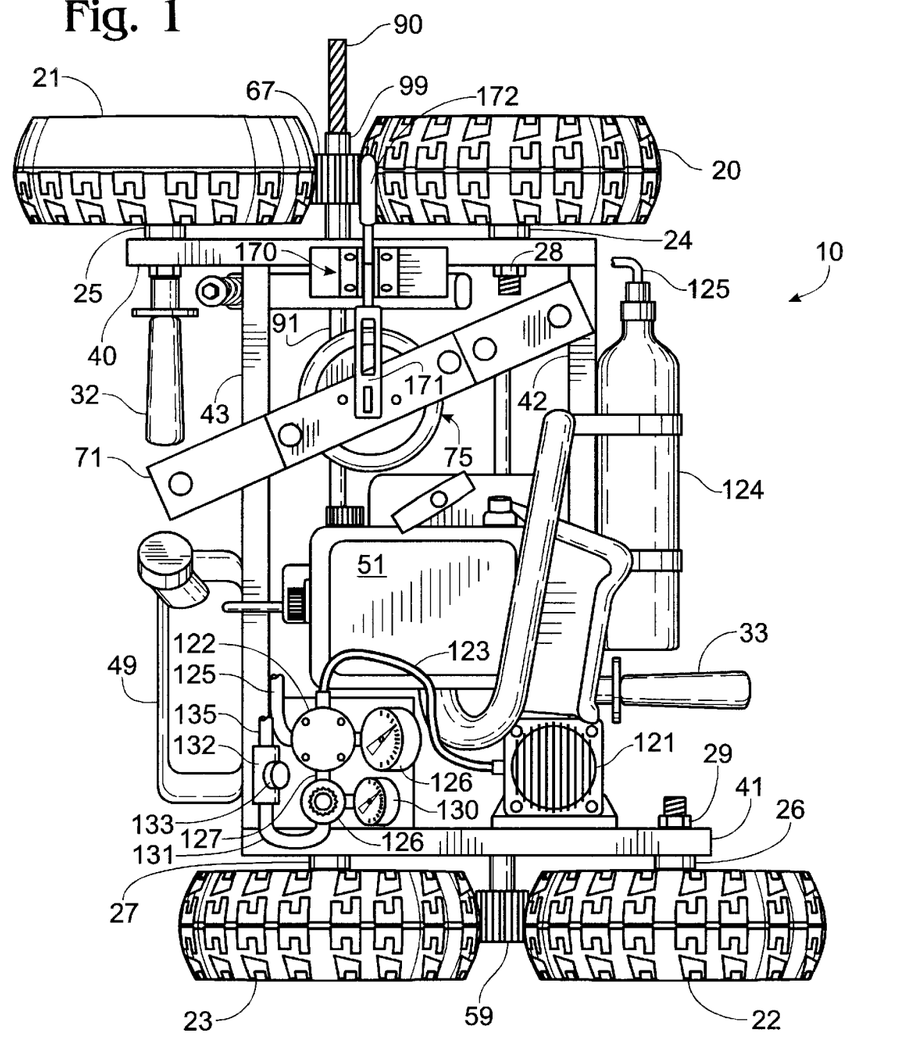
FIG. 1 is a front (operator side), plan view of the self-propelled tree pruning apparatus of this invention.
Figure 2:
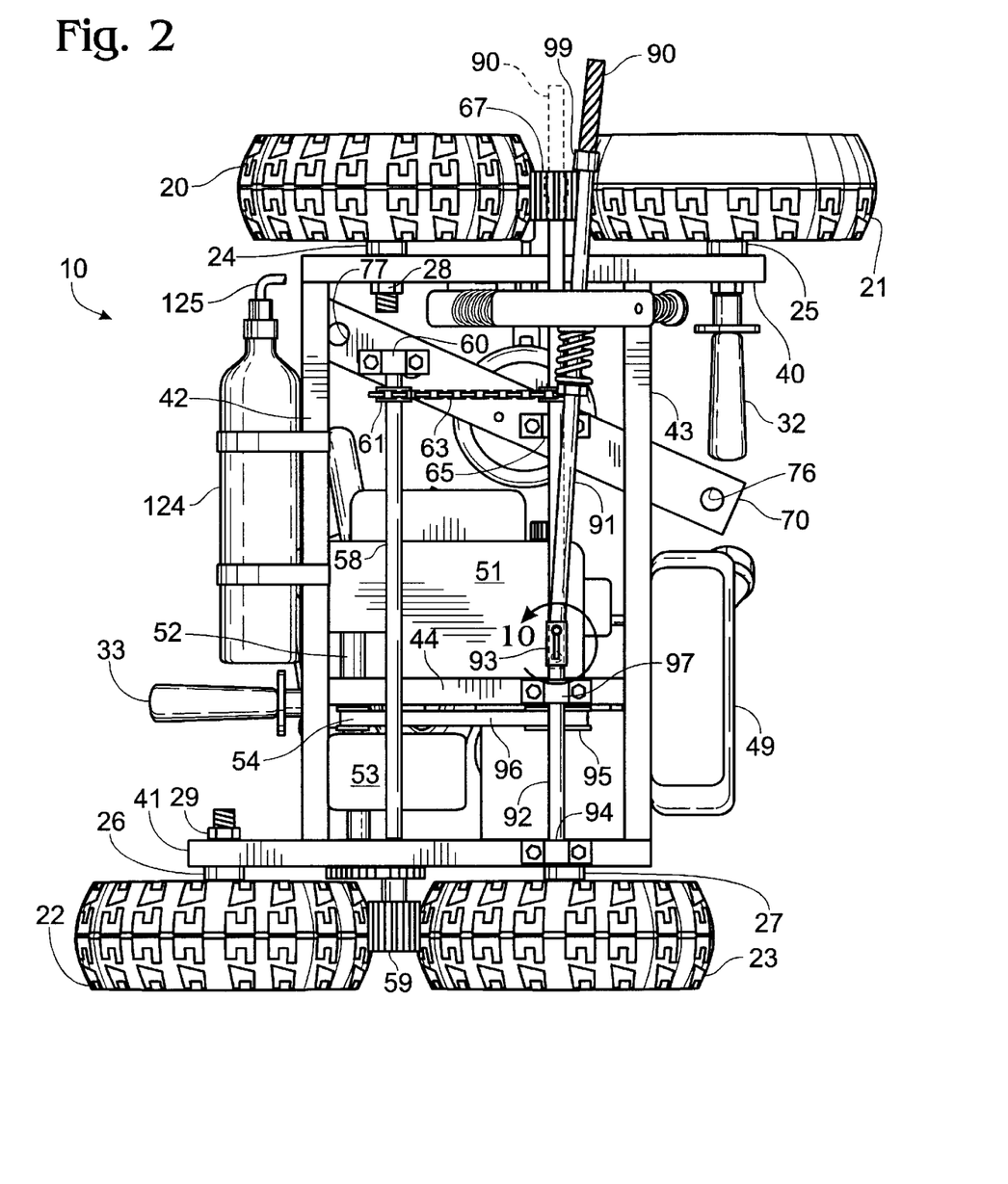
FIG. 2 is a rear (tree side), plan view of the tree pruning apparatus of this invention.
Figure 3:
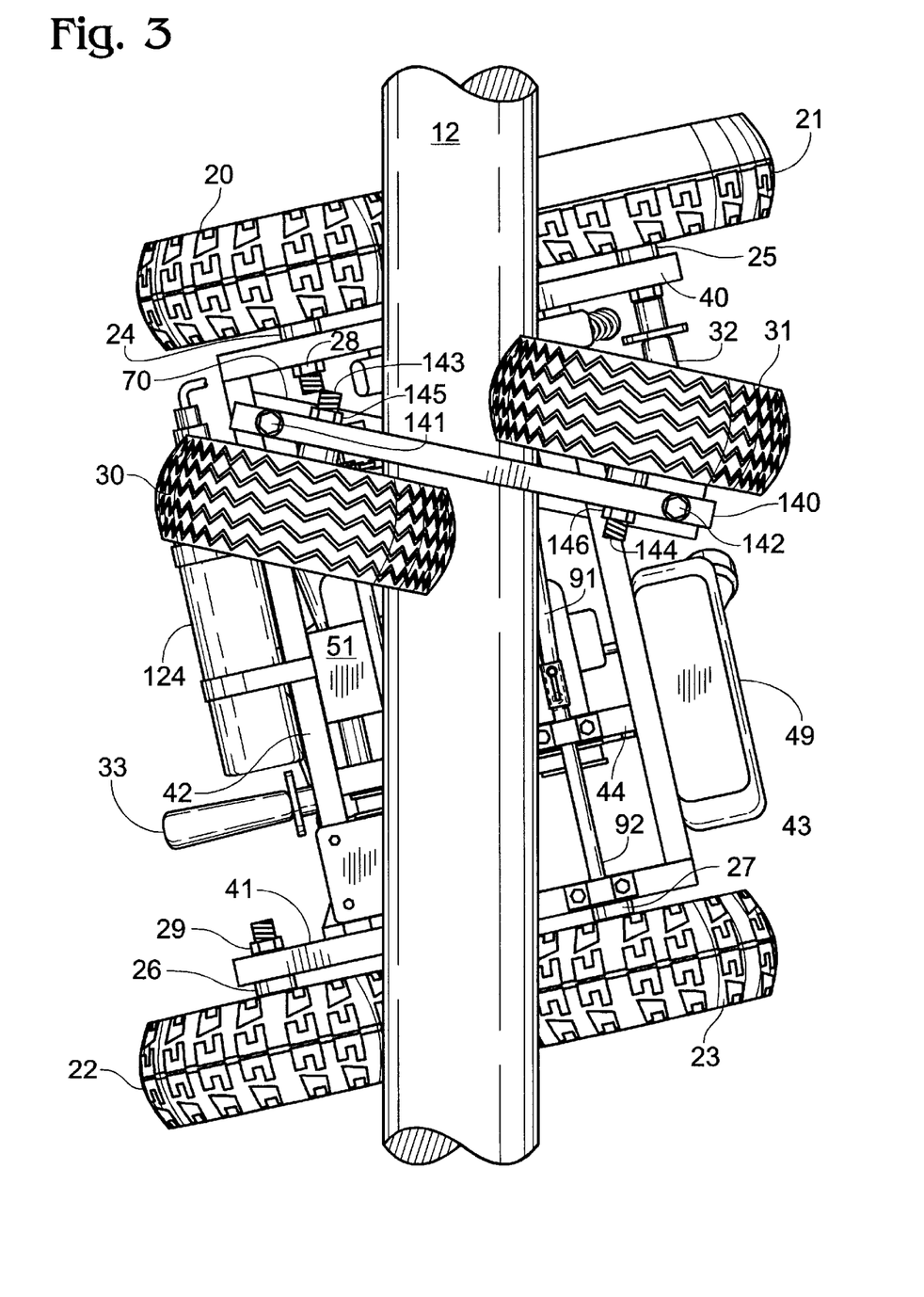
FIG. 3 is a rear, plan view of the tree pruning apparatus of the invention showing the positions of the driving wheels and hugger wheels relative to a tree trunk.

FIGS. 1 and 2 illustrate front and rear views of the tree pruning apparatus of this invention, generally designated by reference numeral 10, and FIG. 3 illustrates a rear view of tree pruning apparatus 10 mounted in its pruning position on a tree trunk 12.

Pruning apparatus 10 is held in climbing engagement with tree trunk 12 by means of an upper pair of driven wheels 20 and 21, a lower pair of driven wheels 22 and 23, and a pair of hugger wheels 30 and 31. In the preferred embodiment described herein, the driven wheels 20–23 and hugger wheels 30 and 31 are all pneumatic tires of substantially the same size, having a diameter of about ten inches.

The axles of the upper pair of driven wheels 20 and 21 are axially displaced from the corresponding axles of the lower pair of driven wheels 22 and 23 a distance sufficient that, when pruning apparatus 10 is mounted on a tree to be pruned (as seen in FIG. 3), driven wheels 20–23 are all positioned at an angle (the "climb angle") to the longitudinal axis of the tree trunk 12 to thereby permit the pruning apparatus 10 to climb the tree trunk 12 in a helical manner as it rotates around the circumference thereof.

The climb angle is preferably between about 10 degrees and about 20 degrees from the horizontal, and most preferably between about 10 degrees and about 15 degrees from the horizontal. In the specific apparatus described herein, a climb angle of about 12 degrees is achieved when the axles of corresponding upper and lower driven wheels (i.e., 20 and 22, and 21 and 23) are offset by a distance of about 5.5 inches.

Pruning apparatus 10 has a chassis comprised of upper horizontal frame member 40, lower horizontal frame member 41, first and second vertical frame members 42 and 43 extending between horizontal frame members 40 and 41 and connected thereto, and an intermediate horizontal frame member 44 extending between vertical frame members 42 and 43 and fastened thereto.

Upper driven wheels 20 and 21 are rotatably attached to the outer ends of axles 24 and 25, respectively, and lower driven wheels 22 and 23 are rotatably attached to the outer ends of axles 26 and 27, respectively. Axles 24 and 25 are perpendicular to upper horizontal frame member 40 and axles 26 and 27 are perpendicular to lower horizontal frame member 41.

Upper driven wheels 20 and 21 are located in the same plane and lower driven wheels 22 and 23 are located in the same plane. The outer surfaces of driven wheels 20 and 21 and the outer surfaces of driven wheels 22 and 23 are spaced apart about 2 inches, respectively, in the preferred embodiment of the invention described herein.

The inner ends of axles 24 and 25 extend through upper horizontal frame member 40. Axle 24 is threaded at its outer end and is secured to upper horizontal frame member 40 by a nut 28. Axle 25 is similarly threaded at its outer end, but is secured to upper horizontal frame member 40 by vertically disposed handle 32 having a threaded female upper end adapted to receive the threaded male outer end of axle 25.

The threaded outer ends of axles 26 and 27 extend through lower horizontal frame member 41 and are secured to lower horizontal frame member 41 by nuts, only nut 29 attached to axle 26 being shown.

A handle 33 is secured to vertical frame member 42, as shown. Handles 32 and 33 permit the pruning apparatus 10 to be easily picked up and moved.

In the preferred embodiment described herein, the tree pruning apparatus 10, including chassis and driven wheels 20–23 has a length and width of about 29 inches each, and a height (without hugger wheels attached) of about 16 inches.

Figure 7:
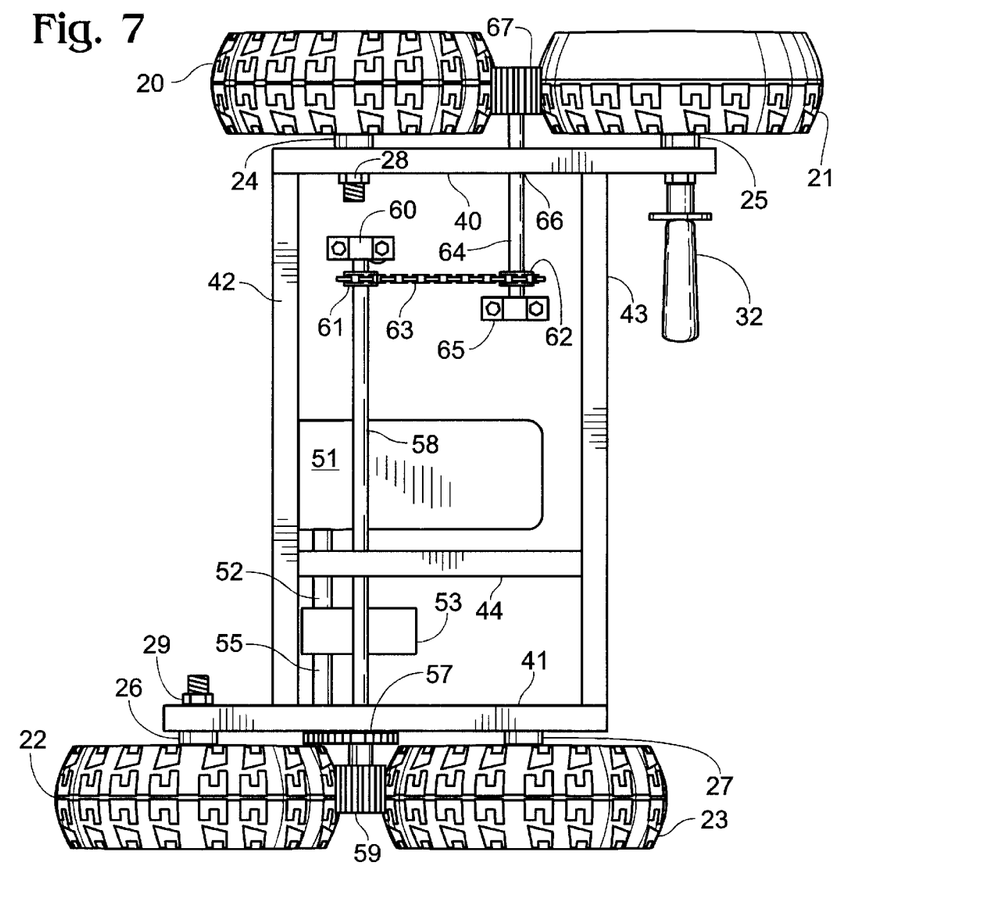
FIG. 7 is a rear (tree-side), plan view of the drive wheels and drive train subassembly of the apparatus of this invention.
Figure 8:
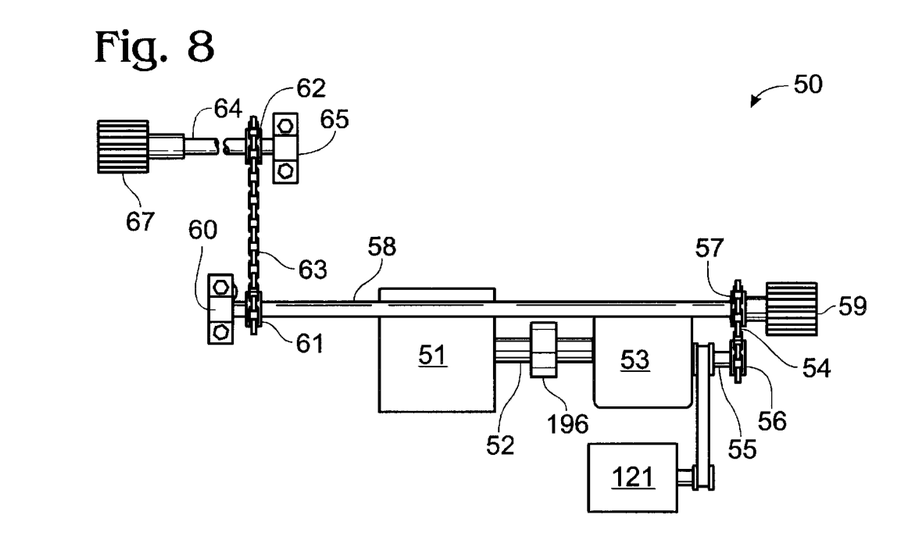
FIG. 8 is a side view, partially in section, of the power train subassembly of the apparatus of this invention.

The power train 50 for the upper and lower driven wheels 20–23 is best seen in FIGS. 2, 7 and 8. A motor 51, either battery powered or gasoline powered, but preferably gasoline powered, is secured to the chassis by any suitable means, such as fastening members (not shown). The motor 51 has its own gas tank but an auxiliary gas tank 49 (as seen in FIGS. 1–3) may be attached to the chassis and operably connected to motor 51 by suitable conduit means.

A primary drive shaft 52 extends outwardly from motor 51 and into gear box 53.

Secondary drive shaft 55 extends from the output end of gear box 53, and has sprocket wheel 56 secured to the outer end thereof. Sprocket wheel 56 communicates with driven sprocket wheel 57, which is secured to lower driven wheels drive shaft 58, by means of sprocket chain 54.

A first driving wheel 59, located at the lower outer end of lower driven wheels drive shaft 58, is adapted to contact and drivingly engage the adjacent outer surfaces of both of the lower driven wheels 22 and 23, as best seen in FIGS. 1, 2, and 7. The spacing apart of driven wheels 22 and 23, and the diameter of driving wheel 59, are selected to provide good traction therebetween.

The other, upper end of lower driven wheels drive shaft 58 is seated in journal housing 60, which is attached to plate 70 (as seen in FIG. 2). A first sprocket wheel 61, located on shaft 58 adjacent journal housing 60, communicates with second sprocket wheel 62 via sprocket chain 63.

Sprocket wheel 62 is located near the lower end of upper driven wheels drive shaft 64, and adjacent lower journal housing 65 which rotatably holds the lower end of upper wheels drive shaft 64. The upper end of upper driven wheels drive shaft 64 is rotatably secured in circular hole 66 in frame member 40. Hole 66 preferably has a bushing seated therein, not shown, to provide intimate but rotatable and wear resistant support for upper wheels drive shaft 64. A second driving wheel 67 is located at the upper, outer end of upper driven wheels drive shaft 64, and drivingly engages upper driven wheels 20 and 21 in the same manner as that described above relative to driving wheel 59 and lower driven wheels 22 and 23.

Figure 5:
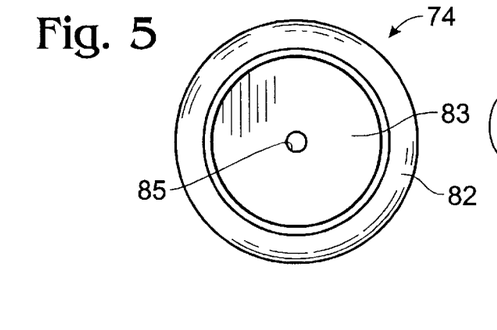
FIG. 5 is a front, plan view of an air bag used in the hugger subassembly of the apparatus of the invention.
Figure 6:
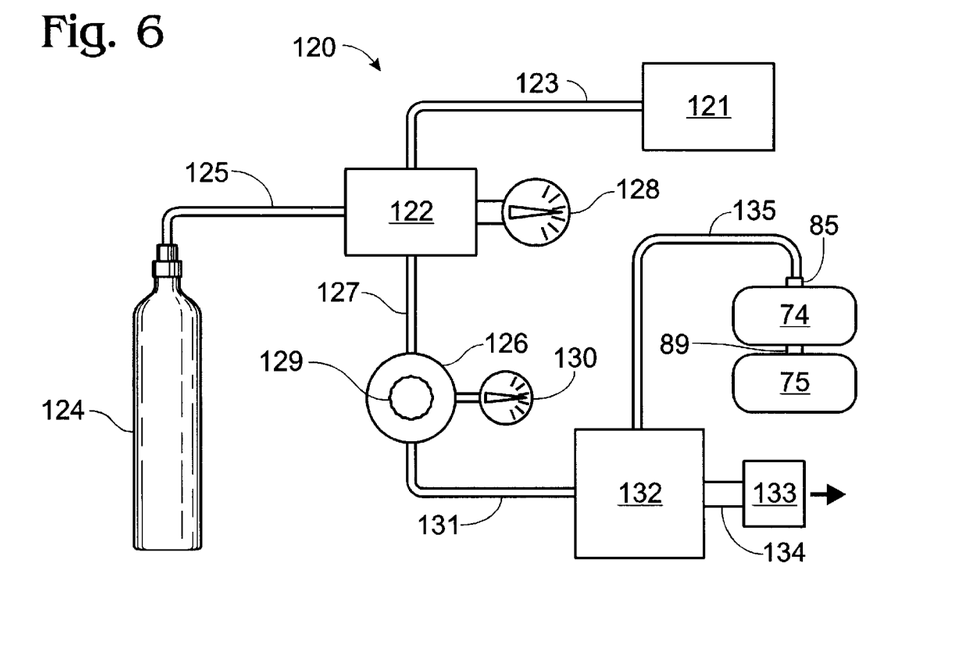
FIG. 6 is a schematic view of the compressed air system subassembly used to inflate the air bags in the apparatus of this invention.

When the pruning apparatus 10 is positioned on a tree to be pruned, hugger wheels 30 and 31 are located on the side of the tree trunk 12 opposite the location of driven wheels 20–23. FIG. 3 shows pruning apparatus 10 in position on a tree trunk 12 and FIGS. 4, 5 and 6 shows various aspects of the construction of the hugger wheel subassembly and the pneumatic means used by the subassembly to squeeze the tree pruning apparatus of the invention against a tree trunk.

Figure 4:
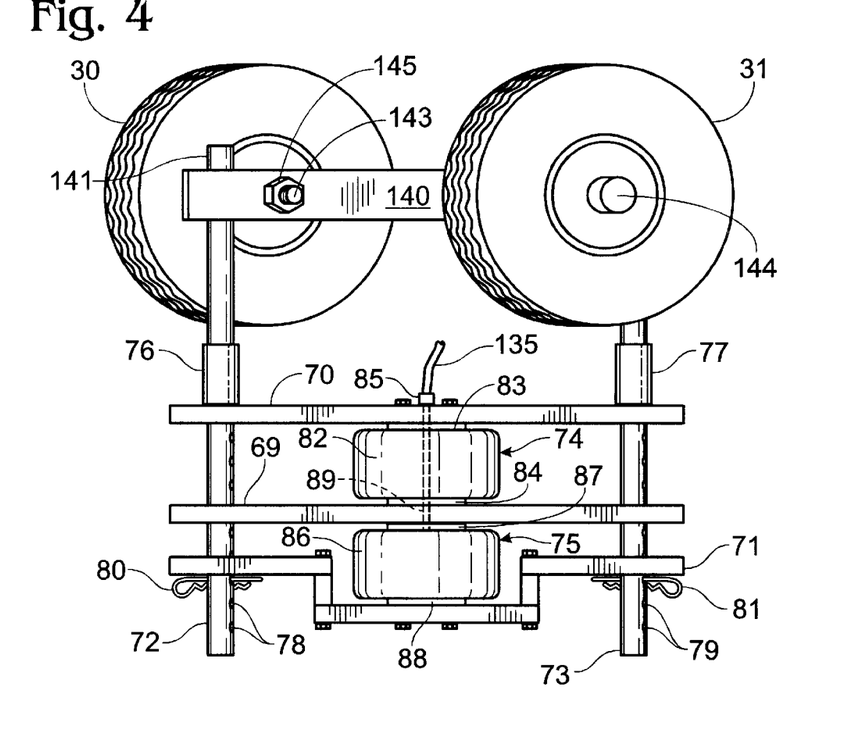
FIG. 4 is a top, plan view of the hugger wheels and pneumatic inflation means subassembly of the apparatus of this invention.

As seen in FIG. 4, inner flat plate 70 and U-shaped outer plate 71 have cylindrical support rods 72 and 73, preferably formed of solid rod stock, extending through circular openings in both ends thereof. Plate 70 is secured to vertical frame members 42 and 43 of the chassis (as seen in FIG. 2). U-shaped outer plate 71 is free to move outward along support rods 72 and 73 until it contacts cotter pins 80 and 81.

Cylindrical guide members 76 and 77 extend outwardly from inner flat plate 70, and are adapted to firmly receive support rods 72 and 73 therethrough.

Inner and outer inflatable air bags 74 and 75 are located between inner plate 70 and outer U-shaped plate 71. A middle, free-floating, stabilizer flat plate 69 is located between air bags 74 and 75 to prevent awkward movement of the air bags 74 and 75 when they are inflated.

In addition, a releasable clamp 170 can be used to prevent movement of the air bags 74 and 75 when they are deflated. As best seen in FIG. 1, clamp 170 is attached to upper horizontal frame member 40, and has a clamp arm 171 which can be forced against the outer face of U-shaped plate 71 by a lever action applied by moving handle 172 upwardly, or released by moving handle 172 downwardly, as well known in the clamping art.

Support rod 72 passes through cylindrical guide member 76 fixed to one end of inner plate 70, and support rod 73 passes through cylindrical guide member 77 fixed to the other end of inner plate 70.

The outer section of support rod 72 has a plurality of locking holes 78 passing therethrough and the outer section of support rod 73 has a plurality of locking holes 79 passing therethrough. Cotter pins 80 and 81, inserted into appropriate ones of locking holes 78 and 79, respectively, secure support rods 72 and 73 against U-shaped plate 71 so that when airbags 74 and 75 are inflated, U-shaped plate 71 is forced outward (away from the tree) which pulls support rods 72 and 73 outward and hugger wheels 30 and 31 inward (toward the tree) and toward driven wheels 20–23.

The outer ends of support rods 72 and 73 are firmly attached to axle support bar 140 by appropriate fastening means, such as nuts 141 and 142 attached to threaded outer ends of support rods 72 and 73. That portion of each support rod 72 and 73 passing through bar 140 has a smaller diameter than the remainder of the rod to thereby provide a firm attachment between the respective rod and the bar 140.

Hugger wheel axles 143 and 144 extend through circular openings in bar 140 and are secured thereto by suitable fastening means, such as nuts 145 and 146 attached to threaded outer ends thereof.

Air bag 74 is shown in a front view in FIG. 5. Air bag 74 is comprised of an inflatable, tire-like body 82, made of a material such as rubber, secured on both sides to metal discs 83 and 84. An air valve stem 85 extends through metal disc 83 and communicates inflatable body 82 with pressurizing and de-pressuring means, as will be discussed below.

Air bag 75 is substantially identical to air bag 74, and has an inflatable body portion 86 secured on both sides to metal discs 87 and 88. An air conduit 89 communicates the interior of air bag 74 to the interior of air bag 75 so that both air bags are inflated and deflated at the same time.

In a preferred embodiment, air bags 74 and 75 are approximately five inches in diameter.

The air supply subassembly 120, which supplies compressed air to air bags 74 and 75, is shown schematically in FIG. 6. Reference is also made to FIG. 1.

An air compressor 121 supplies air to four-way fitting 122 via rigid or flexible conduit 123. Air flows from four-way fitting 122 to reserve tank 124 via flexible conduit 125 and to control valve 126 via flexible conduit 127. Air pressure gage 128 reads the air pressure in reserve tank 124. The air pressure in reserve tank 124 is typically about 120 p.s.i. Control valve 126 is used to set the maximum air pressure in air bags 74 and 75 by twisting knob 129 and reading the air pressure on gage 130. The maximum air pressure for the hugger wheels of the size described herein is typically set at between about 15 and about 20 p.s.i.

Air flows from control valve 126 through flexible conduit 131 to three-way valve 132. A radio controlled servo valve 133 is attached to outlet port 134 of three-way valve 132. Servo valve 133 can be actuated by a radio signal from a transmitter (not shown) to open or close communication between three-way valve 132 and the atmosphere via outlet port 134. When servo valve 133 is in its fully closed position, air flows from three-way valve 132 through flexible conduit 135 to inlet port 85 of air bag 74. Air bag 74 is then inflated, and air flows to adjacent air bag 75 via conduit 89 to also inflate it, both being inflated to the air pressure set by control valve 126.

A radio control transmitter useful in the present invention is an Airtronics Model Avenger 2X which transmits two separate signals, one signal operating servo valve 133 and the other signal operating the throttle of motor 51, all in a manner well known in the art. The transmitter and the servo receivers are proportionately operable, i.e., continuously variable between fully off and fully on.

An important part of the present invention is cutting tool 90 and its drive train. Cutting tool 90 of the invention is a helical milling head. The size of cutting tool 90 can be selected to that which operates most efficiently in the pruning use to which it is being applied. A cutting tool having a diameter of about ½ inch and a length of about 4 inches has been found to be satisfactory for many applications.

Figure 9:
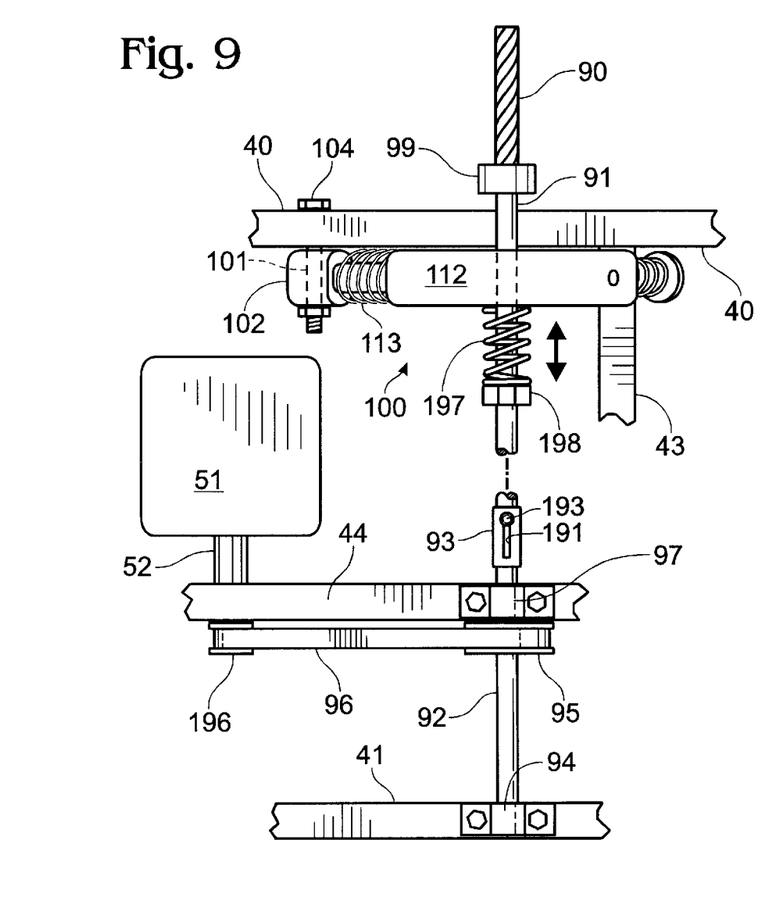
FIG. 9 is a rear (tree side), plan view of the cutter subassembly of the apparatus of this invention and its associated drive train.

The cutting tool subassembly is shown in FIG. 9. Cutting tool 90 is mounted at the upper end of rotatable secondary cutter drive shaft 91 by any suitable means, such as by welding or a chuck.

Figure 10:
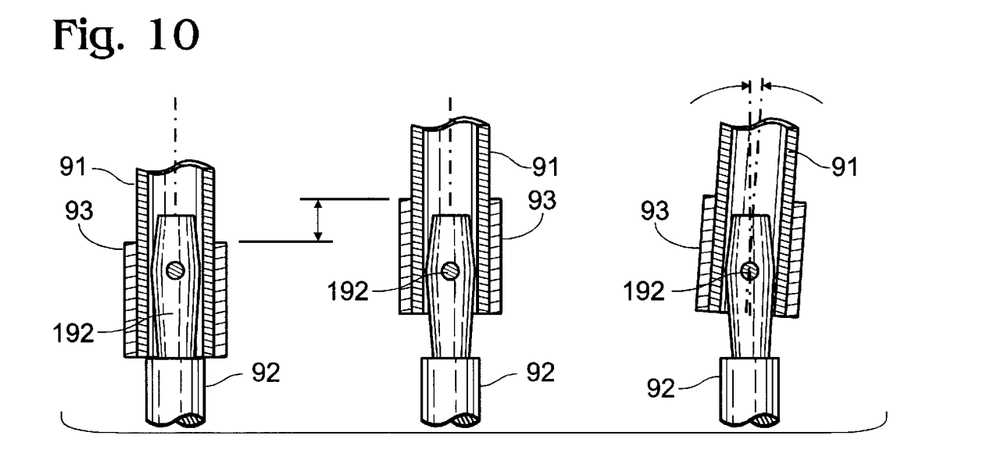
FIG. 10 contains three cross-sectional front views of the cutter drive shaft swivel connection in various positions.
Figure 11:
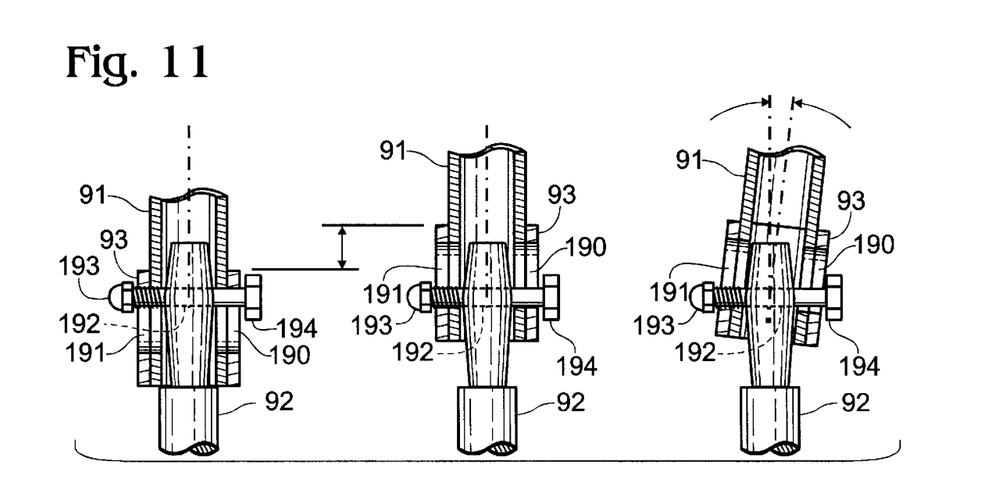
FIG. 11 contains three cross-sectional side views of the cutter drive shaft swivel connection in various positions.

Secondary cutter drive shaft 91, which is tubular, is coupled to primary drive shaft 92 as shown in more detail in FIGS. 10 and 11. Secondary drive shaft 91 has a collar 93 attached to its lower end to provide extra wear resistance.

Primary cutter drive shaft 92, which is made from solid rod stock, has a conically shaped upper end machined thereon which is seated in the lower end of tubular secondary cutter drive shaft 91. A threaded pin 192 passes through the conically shaped upper end of primary cutter drive shaft 92 at approximately its widest part, and is fixedly attached thereto, such as by press fitting or welding. One outer end of pin 192 has an enlarged head portion 193 and the other, threaded end has a nut 194 attached thereto. Pin 192 passes through slots 190 and 191 located in opposite sides of swivel coupling 93. Head 193 and nut 194 are larger in diameter than the width of slots 190 and 191 so that pin 192 is retained within the slots.

Secondary cutter drive shaft 91 can move up and down a distance equal to the length of slots 190 and 191, as shown by the arrows in FIGS. 10 and 11, being stopped at the outer reach of either up or down motion by pin 192 contacting the ends of the slots.

A spring 197 is located on secondary drive shaft 91 between pivotal support arm 100 and spring collar 198. The spring 197 is shown in its uncompressed position in FIG. 9, with the tops of slots 190 and 191 in secondary drive shaft 91 being in contact with pin 192. The spring 197 would become compressed when an upward force sufficient to overcome the compression resistance of the spring is applied to secondary drive shaft 91.

Secondary cutter drive shaft 91 can move inward and outward about the axis of pin 192 (as shown in phantom in FIG. 2 and by the arrows in FIG. 10), and sideways (as shown by the arrows in FIG. 11), due at least in part to the conical shape of the upper end of primary cutter drive shaft 92.

One end of primary cutter drive shaft 92 is rotatably secured in journal housing 94, which is attached to lower horizontal frame member 41. The upper portion of primary cutter drive shaft 92 is rotatably secured in journal housing 97, which is attached to intermediate horizontal frame member 44. A pulley wheel 95 is fixed on primary cutter drive shaft 92 between journal housing 94 and journal housing 97. A pulley belt 96 connects pulley wheel 95 to pulley wheel 196 located on the drive shaft 52 of motor 51. Thus, the cutter tool 90 is rotated at substantially the same rpm as that of the drive shaft 52 of motor 51. A useful motor size to use is about 4 horsepower, such as that used in chain saws sold by Stihl as model number 029 Super.

Figure 12:
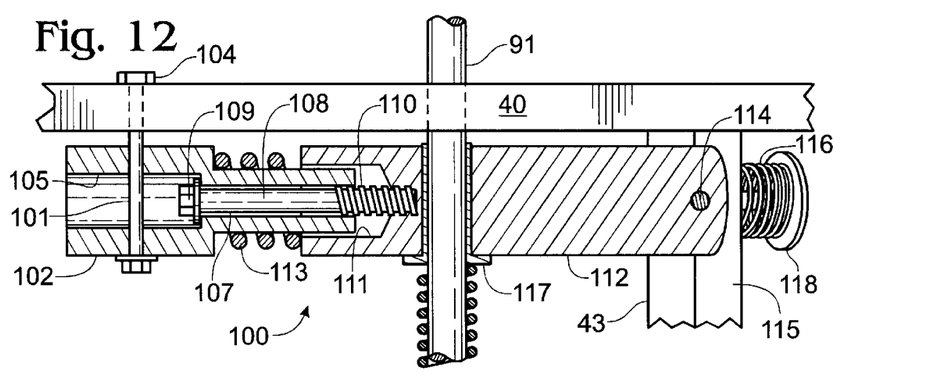
FIG. 12 is a cross-sectional plan view of the pivotal support arm for the cutter drive shaft.

At its upper end, secondary cutter drive shaft 91 is supported by pivotal support arm 100. Reference is made to FIG. 12 for an enlarged cross-sectional plan view of pivotal support arm 100.

Support arm 100 is pivotally attached to upper horizontal frame member 40 by means of a bolt 101 passing through head 102. Bolt 101 also passes through an opening in frame member 40 and has a nut 104 attached to the threaded outer end thereof. Therefore, pivot member 103 can pivot about bolt 101.

Head 102 of support arm 100 has a cylindrical opening 105. Tail 106 of support arm 100 has a cylindrical opening 107. Cylindrical openings 105 and 107 have a common longitudinal axis and communicate with each other as shown.

A connecting screw 108 having an enlarged head 109 at one end and screw threads 110 at the other end is inserted into cylindrical openings 105 and 107, as shown. Enlarged head 109 has a diameter larger than the diameter of cylindrical opening 107 but smaller than the diameter of cylindrical opening 105. Connecting screw body 108 has a diameter smaller than the diameter of cylindrical opening 107.

Tail 106 is inserted into opening 111 of forearm 112. The threaded end 110 of connecting screw 108 is screwed into forearm 112 to thereby secure pivot member 103 to forearm 112.

Spring 113 urges head 102 away from forearm 112, the position shown in FIG. 12. A force sufficient to overcome the resistance of spring 113 to compression can urge forearm 112 toward head 102, for purposes which will be described below.

A pin 114 extends through the outer end of forearm 112 and through a pin support flange 115 attached to vertical frame member 43. Spring 116, in its uncompressed state, retains forearm 112 against flange 115.

A bushing 117, seated in a hole extending through forearm 112, receives secondary cutter drive shaft 91 therethrough.

The drive train assembly for cutter 90 thus described permits cutter 90 to move along three axes, i.e., to rise vertically upward and downward, horizontally side to side, and horizontally inward and outward.

Collar 99 is located on secondary cutter drive shaft 91 at the juncture of cutter tool 90 and shaft 91. Collar 91 is of a diameter selected to represent the closest spacing between cutter 90 and trunk 12. That is, during cutting of a branch by cutter 90, it moves inward toward trunk 12. Only collar 99 prevents the cutter 90 from contacting trunk 12. A suitable diameter for collar 99 has been found to be about one inch.

In operation, hugger wheels 30 and 31 are removed from the hugger wheel subassembly by removing cotter pins 80 and 81. The chassis is placed adjacent a tree trunk with the driven wheels 20–23 placed in contact therewith, as shown in FIG. 3. The hugger wheels 30 and 31 are then placed back on the chassis by slipping axle support rods 72 and 73 carrying hugger wheels 30 and 31 through cylindrical guide members 76 and 77 until a somewhat snug fit is achieved. Cotter pins 80 and 81 are reinserted through appropriate ones of holes 78 and 79.

The motor 51 is started, with the radio controlled motor throttle set at idling speed. Servo valve 133 is closed by actuating the radio control transmitter (not shown), and air bags 74 and 75 are thereby inflated by compressed air to the pressure set by adjustable valve 129, as read on gage 130.

The throttle is advanced to full operating rpm by use of a radio control transmitter (not shown). Cutter 90 is thereby rotated at substantially the rpm of the motor drive shaft 52 and gear box 53 is thereby engaged to set in motion driven wheels 20–23 and to activate air compressor 121. The gear box 53 is selected to reduce the rpm of the motor drive shaft 52 in a ratio of about 53:1.

Driven wheels 20–23 now begin to drive the tree pruner 10 about and up the tree trunk 12. Since the wheels 20–23 are located at an angle of about 12 degrees to the horizontal, the tree pruner proceeds around and up the tree trunk 12 in a helical path. Looking down the tree trunk 12, the tree pruner 10 moves in a clockwise direction about the longitudinal axis of the tree trunk.

When cutter 90 engages a branch, it pulls itself upwardly and inwardly of the branch until collar 99 abuts the tree trunk 12, at which point the cutter 90 proceeds to cut through the branch at such position adjacent the trunk, cutter 90 being continuously pressed against the branch by the action of driven wheels 20–23.

Driven wheel 21, which is the leading upper driven wheel as pruner 10 moves around and up the trunk 12, preferably has its upper tread removed (as shown) to make it thinner and thereby move more easily move the branch that adjacently located cutter 90 is about to engage. Alternatively, a thinner wheel of the same diameter could be used.

After the branch is removed, the tree pruner proceeds upward in its helical path until the next branch is engaged by the cutter 90, and the cutting process is repeated. As the tree pruner 10 climbs higher, the trunk 12 becomes narrower, i.e., is tapered toward a smaller diameter, and air flows into and expands the airbags 74 and 75 further in order to maintain the preset air pressure therein, thus keeping the tree pruner held tightly against the tree trunk 12.

Upon achieving the desired height up the trunk 12, the operator actuates the radio control transmitter to send a first signal to the pivotal lever actuating the throttle of motor 51 to reduce its speed to idle, and a second signal to radio-controlled servo valve 133 to open and thereby exhaust air from the airbags 74 and 75. As air exhausts, the pressure holding the hugger wheels against the tree trunk is relaxed, and the tree pruner quickly slides down the tree to the ground. In the event the tree pruner begins to descend too rapidly, the operator can actuate servo valve 133 by use of his radio-control transmitter to temporarily inflate air bags 74 and 75 with pressurized air from reserve tank 124.

The entire operation of pruning a tree up to about 30 feet from the ground, from the beginning of the ascent of pruner 10 up a tree to the descent of pruner 10 back to the ground, generally takes less than about 3 to 4 minutes.

Although specific embodiments of the invention have been described, modifications to such embodiments may be made without departing from the spirit and scope of the invention intended to be claimed herein.

The invention claimed is:

1. A self-propelled tree pruning apparatus comprising:
    a frame;
    at least a first pair of driven wheels rotatably attached to said frame in a position adapted to rotatably engage a tree trunk;
    a pair of hugger wheels rotatably held by support means, said support means being adjustably attached to said frame to thereby permit said hugger wheels to be positioned a distance from said driven wheels sufficient to permit said trunk to fit between said driven wheels and said hugger wheels;
    pneumatic means for urging said hugger wheels toward said driven wheels to thereby drivingly engage said driven wheels with said trunk;
    a rotatable cutting tool with helical cutting edges held in a vertical position by a rotatable drive shaft attached thereto, said drive shaft being attached to said frame in a manner to allow movement of said drive shaft and attached cutting tool along three axes; and
    motive means for driving said driven wheels and said rotatable cutting tool attached to said frame.

2. The apparatus of claim 1 including at least one additional wheel located on the same side of said frame as said driven wheels and adapted to engage said tree trunk.

3. The apparatus of claim 1 including a second pair of wheels located on the same side of said frame as said driven wheels and adapted to engage said tree trunk.

4. The apparatus of claim 3 wherein said second pair of wheels are driven wheels.

5. The apparatus of claim 1 including a drive train operably connecting said motive means to said driven wheels, said drive train including a gear box that reduces the rpm of said motive means and at least a first drive shaft operably connecting said gear box to at least one of said driven wheels.

6. The apparatus of claim 5 wherein said first drive shaft has an outer end remote from said gear box, and at least one driving wheel located at said outer end of said drive shaft which is in driving contact with the outer surface of at least one of said driven wheels.

7. The apparatus of claim 6 wherein said driving wheel is in driving contact with the outer surfaces of both driven wheels of at least one of said first and second pairs of driven wheels.

8. The apparatus of claim 1 including a drive train operably connecting said motive means to said driven wheels, said drive train including a gear box that reduces the rpm of said motive means, first and second drive shafts each having one end operably connected to the output shaft of said gear box, first and second driving wheels located at each of the other ends of said first and second drive shafts, respectively, each of said first and second driving wheels being in contact with at least one driven wheel of each of said first and second pairs of driven wheels, respectively.

9. The apparatus of claim 8 wherein said first and second driving wheels contact both driven wheels of said first and second pairs of driven wheels, respectively.

10. The apparatus of claim 1 including a drive train operably connecting said motive means to said cutting tool, said drive train including a primary drive shaft operably connected to said motive means to effect rotation thereof, a secondary drive shaft coupled at one end to said primary drive shaft in a manner such as to permit said secondary drive shaft to move along three axes, said secondary drive shaft being attached at its other end to said cutting tool, an intermediate portion of said secondary drive shaft being rotatably attached to a swivel arm in a manner such as to permit said secondary drive shaft to move along said three axes, at least one end of said swivel arm being pivotally attached to said frame.

11. The apparatus of claim 1 wherein said pneumatic means includes at least one inflatable air bag and compressed air supply means communicating with said air bag through a conduit.

12. The apparatus of claim 11 wherein said pneumatic means includes two inflatable air bags in communication with said compressed air supply means.

13. The apparatus of claim 12 wherein said inflatable air bags are in communication with each other by conduit means.

14. The apparatus of claim 12 wherein said compressed air supply means includes a compressor attached to said frame, said compressor being operably connected to said motive means.

15. The apparatus of claim 14 wherein said compressed air supply means additionally including a reserve air tank attached to said frame, said air tank communicating with said compressor and said air bags by conduit means.

16. The apparatus of claim 15 including valve means communicating with the compressed air supply means and with said air bags by conduit means, said valve having an outlet port communicating with the atmosphere, and means for opening and closing said outlet port.

17. The apparatus of claim 16 wherein said means for opening and closing said outlet port is a radio controlled servo valve.

18. The apparatus of claim 1 wherein said motive means is a gasoline engine.

19. The apparatus of claim 18 wherein said gasoline engine has a radio controlled throttle.

* * * * *